United States Patent [19]
Föhl

[11] Patent Number: 5,346,152
[45] Date of Patent: Sep. 13, 1994

[54] BELT PRETENSIONER FOR VEHICLE SAFETY BELT SYSTEMS

[75] Inventor: Artur Föhl, Schorndorf, Fed. Rep. of Germany

[73] Assignee: TRW Repa GmbH, Alfdorf, Fed. Rep. of Germany

[21] Appl. No.: 39,747

[22] Filed: Mar. 30, 1993

[30] Foreign Application Priority Data

Apr. 2, 1992 [DE] Fed. Rep. of Germany ....... 4211009

[51] Int. Cl.⁵ ............................................. B60R 22/46
[52] U.S. Cl. .................................... 242/371; 280/806
[58] Field of Search ............ 242/107, 107.2, 107.4 R, 242/107.4 A, 107.4 B; 280/806, 807, 808; 297/474–480

[56] References Cited

U.S. PATENT DOCUMENTS

| | | | |
|---|---|---|---|
| 3,879,054 | 4/1975 | Lindblad | 280/806 X |
| 4,023,427 | 5/1977 | Beier | 280/806 X |
| 4,615,540 | 10/1986 | Sedlmayr et al. | 280/806 |
| 4,647,071 | 3/1987 | Tabata | 280/806 |
| 4,750,759 | 6/1988 | Escaravage | 242/107 X |

FOREIGN PATENT DOCUMENTS

| | | |
|---|---|---|
| 3044951 | 6/1982 | Fed. Rep. of Germany . |
| 3307093 | 9/1983 | Fed. Rep. of Germany . |
| 3432451 | 5/1986 | Fed. Rep. of Germany . |
| 3629713 | 3/1988 | Fed. Rep. of Germany . |
| 2157152 | 10/1985 | United Kingdom . |

*Primary Examiner*—John M. Jillions
*Attorney, Agent, or Firm*—Tarolli, Sundheim & Covell

[57] ABSTRACT

A belt pretensioner for a safety belt system including a belt retractor (10) fitted with an automatic locking system, and a deflection fitting (12), from which the belt (14) extends in a straight line to the belt retractor (10), comprises a U-like frame (18) and a bracket (22), which in a neutral position is held perpendicularly to the path of the belt. The belt (14) is freely passed between a deflection member (20), which connects the side walls of the frame (18) and a roll (30) mounted for free rotation in the bracket (22). When the belt pretensioner is tripped, the bracket (22) is pulled though between the base of the frame (18) and the deflection member (20) in order to form a loop of belt webbing.

8 Claims, 3 Drawing Sheets

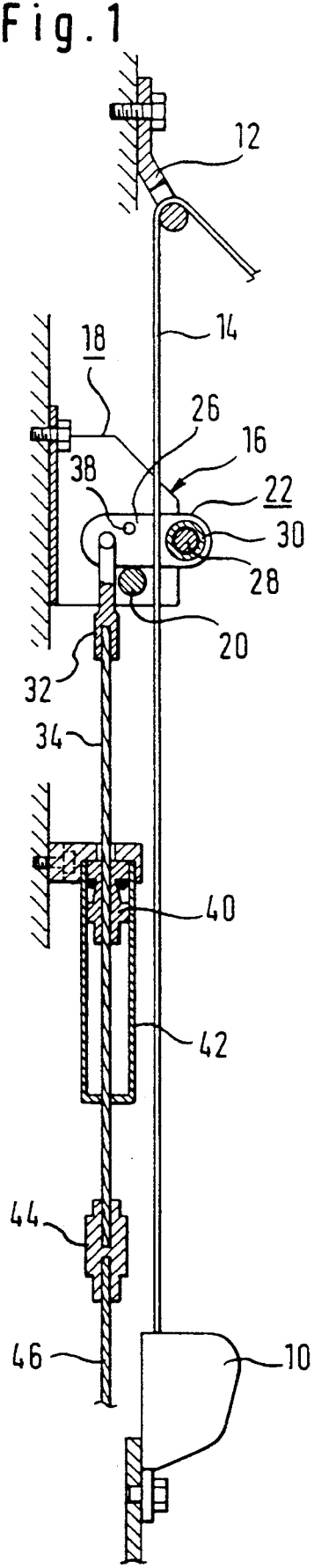
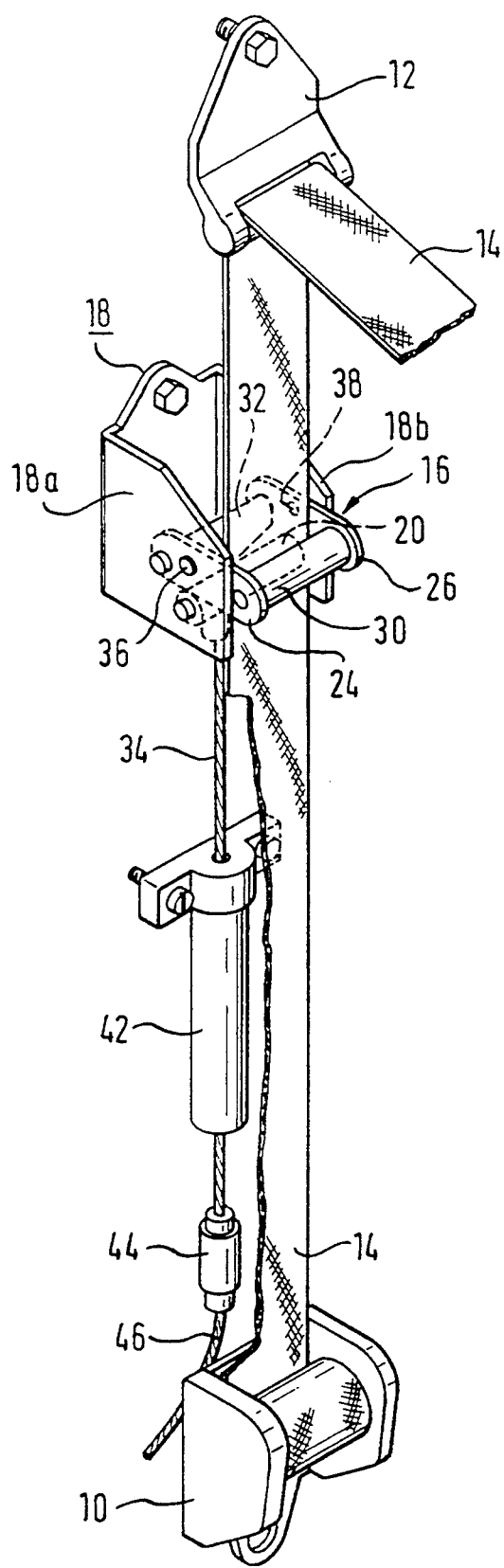

BELT PRETENSIONER FOR VEHICLE SAFETY BELT SYSTEMS

The present invention relates to a belt pretensioner for a vehicle safety belt system. In a conventional safety belt pretensioner such as shown in German patent publication DE 3,307,093 A, a support part is arranged on one side of the freely extending belt at a small distance from it and an engagement part is arranged on the other side of the freely extending belt at a small distance from it. A linear drive is connected to the engagement part by means of a tractive element, which element, on tripping of the belt pretensioner, moves the engagement part towards the belt, moves the belt towards the support part and ultimately moves the engagement part past the support with the formation of a loop in and parallel to the course of the belt.

Such a belt pretensioner may be readily integrated in a pre-existing safety belt system, since of course the belt is not altered and it is possible to utilize a conventional belt retractor with an automatic locking system. The linear drive may be constituted by a pyrotechnical piston and a cylinder unit or be derived from the relative movement of part of the vehicle (the engine or transmission block) if the vehicle is involved in an accident. More specifically, the engagement part is formed by a moving roll mounted on a pivoting bell crank. In order to form a belt loop, the roll moves through between a pair of spaced deflection rolls. The linear drive is connected to an arm of the bell crank. The pivoting movement of the bell crank, however, necessitates a large amount of free space, which is hardly likely to be available in existing vehicle designs. In a more compact design, see the German Patent 3,044,951, the belt runs through a loop at the end of a pulling cable and on activation of the linear drive the belt is moved by the pulling cable loop against a deflection roll, and then past it and with the formation of the belt loop parallel to the run of the belt, downwards towards the belt retractor. Such a belt pretensioner has only a minimum space requirement; but, however, the pulling cable may damage the belt.

The present invention provides a belt pretensioner which does not require much space for its accommodation in the vehicle and prevents damage to the belt.

In accordance with the invention the engagement part is formed by a rod held between the first ends of two parallel legs of a rocking bracket, which in the neutral position of the belt pretensioner with the legs held transversely in relation to the belt, bears via the edges thereof on a deflection member. The linear drive engages on the opposed ends of the legs. Preferably a roll is rotatably mounted on the rod to prevent damaging of the belt. When the belt pretensioner is tripped, the bracket moves from its neutral position in which it is held, for instance, by shear pins, in a manner which is comparable with that of a pulling cable loop. It is firstly pivoted about the deflection member constituting an abutment, but then slides along its surface in an attempt to avoid it, the bracket being further pivoted. After this the bracket is moved past the deflection member, the belt loop then being formed. During the pivot movement of the bracket the belt is firstly moved against the deflection member and then continuously moved around the latter. This movement takes place in a manner free of jerks and is one reason for avoiding damage to the belt.

Preferably the belt pretensioner is integrated in a U-like frame, between whose side walls the deflection member is arranged. The bracket is held on the frame in its inactive position by shear pins. The base of the frame constitutes a guide surface for the bracket, which urges the same, as it moves past the deflection member, along a path, which runs directly past the deflection member.

The deflection member is preferably constituted by a pin mounted so that it cannot rotate and which has a surface structured to promote friction between it and the belt webbing. Conventional safety belt systems comprise a belt retractor, which is equipped with a vehicle-sensitive locking system. The belt runs along a straight line between the belt retractor and a deflection fitting. The belt pretensioner is preferably arranged on this belt section extending in a straight line between the belt retractor and the deflection fitting. When the belt pretensioner is tripped and a pull is exerted on this section of the belt, the belt retractor will be in the locked condition. As the tension force increases, the coil of the belt drum is drawn tight owing to the so-called film reel effect, a certain length of belt being drawn off from the belt retractor and the effective stroke of the belt pretensioner will be decreased by the amount of this length of belt. Since, however, in the case of the above-noted further development of the belt pretensioner the belt is run around the pin which is prevented from rotating and on whose surface there is a high degree of friction for the belt, the tension of the belt will be considerably diminished and will be responsible for substantially preventing the film reel effect. For a coefficient of friction ($\mu$) of 0.4 and a wrap angle of ($\alpha$) of 180°, the equation $e^{\mu\alpha}$ shows that there will be a decrease in the tension by a factor of 3.5.

Further features and advantages of the invention will be seen from the following description and from the drawing, which is now referred to.

FIG. 1 is a partly sectioned, diagrammatic side elevation of the belt pretensioner as built into a pre-existing safety belt system.

FIG. 2 is a perspective view of the arrangement illustrated in FIG. 1.

In the case of a conventional safety belt system, a belt retractor 10 is attached to the B pillar of the vehicle adjacent to the floor thereof. Above the belt retractor and generally at the level of the head of an occupant of the vehicle, a belt deflection fitting 12 is secured to the B pillar of the vehicle. Between the belt retractor 10 and the deflection fitting 12 a portion 14 of the belt extends linearly. A belt pretensioner generally referenced 16 is arranged on this portion 14 of the belt.

Figure 6:
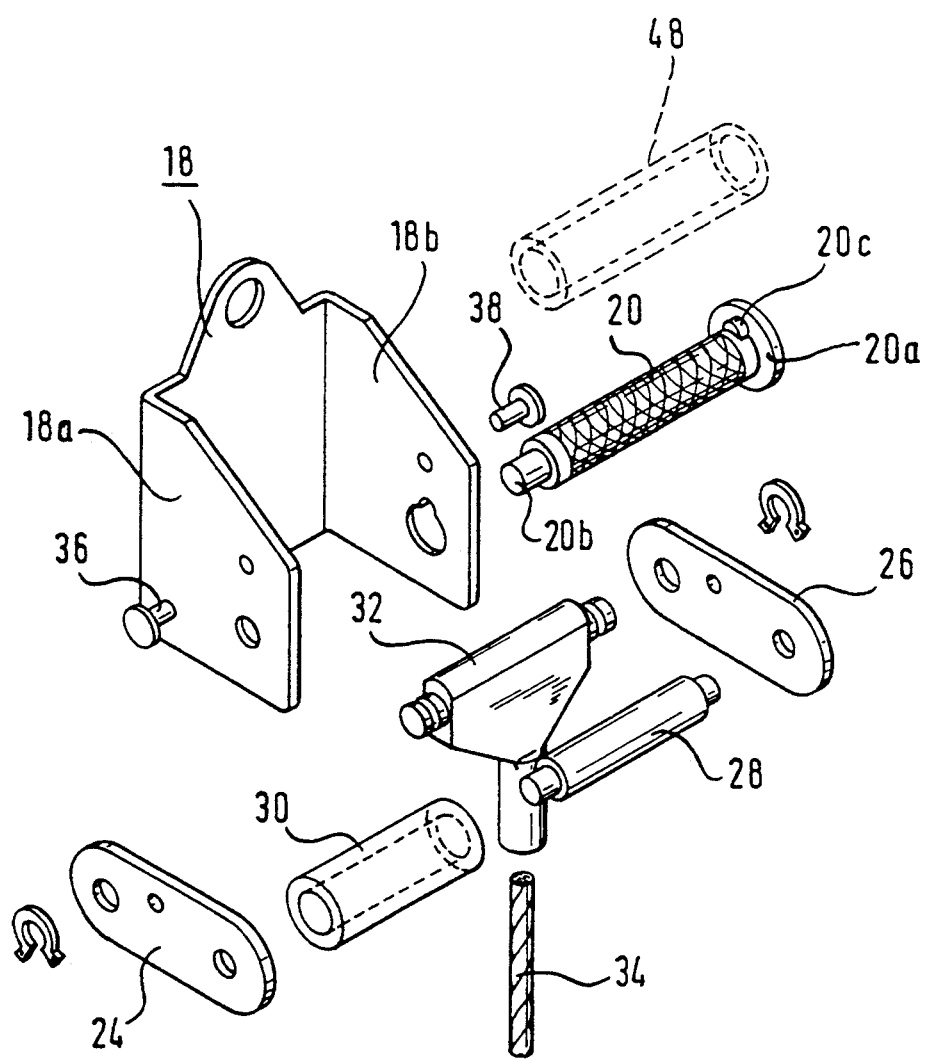
FIG. 6 is an exploded view of the belt pretensioner.

The belt pretensioner 16 comprises a U-like frame 18, which is secured to the B pillar of the vehicle as well. The two walls 18$a$ and 18$b$ of the frame 18 are connected with each other by a deflection member 20. This deflection member 20 is, as illustrated in FIG. 6, constituted by a rigid pin, which at its one end carries a collar 20$a$ for engagement with the outer side of the side wall 18$b$ of the frame 18 and at its other opposite end, referenced 20b, it is secured to the side wall 18a by rivetting. The collar 20 has a spur 20c, which fits into a corresponding recess in the side wall 18b of the frame part 18 in such a manner as to prevent relative rotation.

Figure 3:
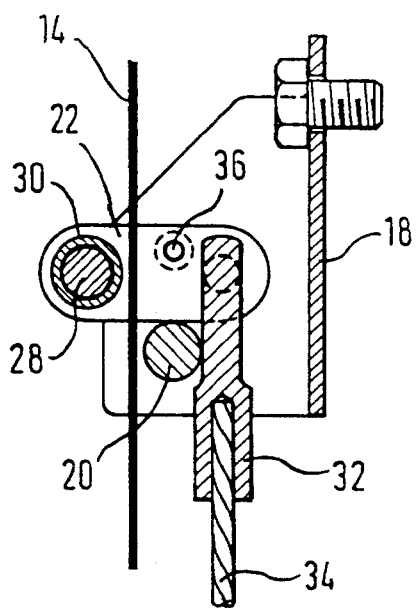
FIG. 3 is a sectional view of the belt pretensioner as such in the neutral setting.

On the frame 18 a rocking bracket 22 is held in a neutral position as illustrated in FIGS. 1, 2 and 3. This bracket 22 consists of two parallel, spaced apart legs 24 and 26, which at first ends thereof are connected with each other by a rigid shaft 28, on which a roll 30 is rotatably mounted. Between the other ends of the legs 24 and 36 a T-like tension anchor or terminal 32 is pivotally mounted and is secured to a tension transmitting or pulling cable 34. The bracket 22 is held in the neutral position as illustrated in FIGS. 1 through 3 by shear pins 36 and 38, which are fitted on the one hand through aligned holes in the side walls 18a and 18b of the frame 18 and on the other hand in holes in the legs 24 and 26 of the bracket 22. In this neutral position the legs 24 and 26 of the brackets 22 are arranged transversely to the direction of run of the belt portion 14. The bracket 22 bears at the edges of the legs 24 and 26 on the deflection member 20. This deflection member 20 is arranged on the one side of the belt portion 14 at a small distance from the same and the roll 30 is arranged at some distance on the opposite side of the belt portion 14. The belt is consequently trained between the deflection member 20 and the roll 30 and between the legs 24 and 26 of the bracket 22 without any obstruction.

The pulling cable 34 constitutes part of a linear drive system of the belt pretensioner.

This linear drive may include a pyrotechnical piston and cylinder unit or be derived from a part of the vehicle, which on a collision of the vehicle moves in relation to the vehicle bodywork, more particularly the engine and transmission block. Along the path of the pulling cable 34 there is a runback check, which consists of a runner 40 swaged onto the pulling cable 34 and a cylinder 42 secured to the B pillar in which the runner 40 slides. The runner 40 is able to be moved freely towards the belt retractor 10, but in the opposite direction movement is prevented by clamping members: return movement of the runner 40 in the cylinder 42 is, if intended, possible with a plastic deformation of the cylinder 42, so that load peaks in the belt system are absorbed. The end of the pulling cable 34 is joined by means of a coupling member 44 with a mechanical control cable having an inner core 46 and an outer sheath, not illustrated, in order to produce a connection with a suitable member of the vehicle which in a collision would be moved in relation to the vehicle bodywork, that is to say, more particularly the engine and transmission block. The coupling member 44 is broken off at a predetermined pulling force in order to protect the occupant of the vehicle against excessive pulling forces and in order to provide a limitation of the stroke of the belt pretensioner.

Figure 4:
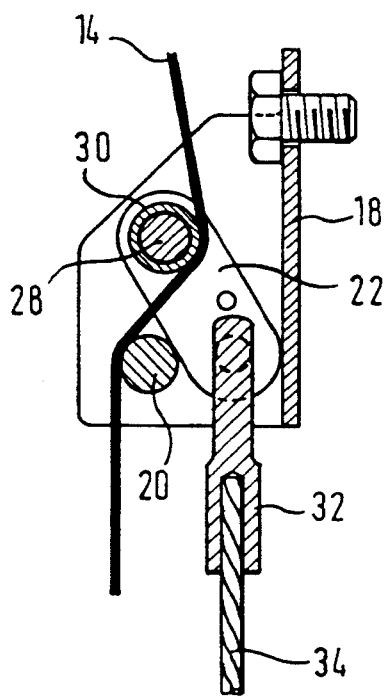
FIG. 4 is a sectional view corresponding to FIG. 3, same indicating the condition shortly prior to tripping of the belt pretensioner.
Figure 5:
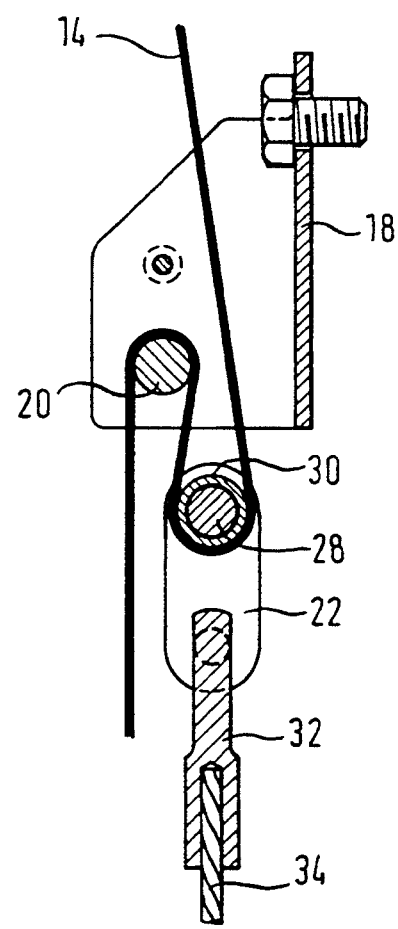
FIG. 5 is a view corresponding to FIGS. 1 and 2 indicating the the belt pretensioner during the course of the formation of a loop of the belt.

When the belt pretensioner is tripped a pulling force is exerted via the pulling cable 34 and the terminal 32 on the bracket 22, so that firstly the shear pins 36 and 38 are shorn off. The bracket 22 bearing on the deflection member 20 is not rocked, the roll 30 being shifted towards the deflection member 20 until it comes into contact with the belt portion 14. On further rocking movement of the bracket 22 it slides over the surface of the deflection member 20, the roll 30 causing the belt firstly to be moved against the surface of the deflection member 20 and to be then gradually deflected about it. Simultaneously, the bracket 22 now slides over the surface of the deflection member 20, as illustrated in FIG. 4, the ends of the legs 24 and 26 adjacent to the terminal 32 striking against the base of the frame 18 and being guided by the same. The bracket 22 is now pulled between the deflection member 20 and the base of the frame 18 with the formation of a loop in the belt portion 14. This condition is illustrated in FIG. 5. The loop of the belt is enlarged by a further downward movement of the bracket 22 with the terminal 32 until the pulling action exerted by way of the pulling cable 34 has come to an end.

Even prior to the tripping of the belt pretensioner, the belt retractor 10 is locked by its locking mechanism. Therefore, during formation of the loop of the belt the portion of the belt running from the deflection fitting 12 to the occupant of the vehicle is shortened. In order to prevent a significant length of belt also being drawn off the belt retractor 10 owing to the film spool effect, the deflection member 20 is provided with a frictional surface where it is in engagement with the belt in order to increase friction therewith. A more particularly effective way of enhancing friction is the application of a sleeve of rubber-like material to the deflection member 20. This sleeve 48 must, however, be mounted on the deflection member 20 in such a manner as to prevent relative rotation, so that the desired wrapping engagement friction is produced, by which the pulling force occurring on the belt retractor 10 may be diminished to less than a third of the value without such friction. Preferably the deflection member 20 is produced with a knurled surface, as illustrated in FIG. 6, while the sleeve consists of a synthetic resin material, which is shrunk onto the deflection member 20, so that there is an interlocking connection between the sleeve and the deflection member 20.

I claim:

1. A belt pretensioner for a vehicle safety belt system, comprising:
    a frame for attachment to the vehicle bodywork and having a pair of parallel side walls interconnected by a base and a deflection member mounted between said side walls,
    a linear drive adapted to provide a pulling force,
    a belt retractor,
    a belt deflection fitting,
    and a bracket having a pair of parallel legs spaced from each other, a rod interconnecting said legs at a first end thereof and an engagement member connected to a second end of each leg,
    wherein said legs have an intermediate edge portion bearing on said deflection member and a section of belt webbing extends in a plane between said retractor and said deflection fitting, and extends freely through an opening defined between said legs, said rod and said deflection member, and
    wherein said linear drive is connected to said engagement member,
    said bracket, upon activation of said linear drive, moving around said deflection member, towards and along said base, engaging said webbing section and forming a loop of belt webbing by pulling said webbing against, around and past said deflection member to reduce the effective length of belt webbing.

2. The belt pretensioner of claim 1, wherein said bracket is held in said frame by at least one shearable pin in a normal rest position generally transverse to said plane.

3. The belt pretensioner of claim 2, wherein a pair of shear pins is inserted through aligned openings of said bracket legs and said side walls.

4. The belt pretensioner of claim 1, wherein a webbing engagement roller is rotatably mounted on said rod.

5. The belt pretensioner of claim 1, wherein said engagement member is formed by a generally T-shaped terminal pivotally mounted between said bracket legs.

6. The belt pretensioner of claim 5, wherein said terminal is connected to said linear drive through a pulling cable.

7. The belt pretensioner of claim 1, wherein said deflection member is formed by a rod rigidly attached to said frame and having a peripheral surface structured for enhancement of friction with said belt webbing.

8. The belt pretensioner of claim 1, wherein said deflection member is formed by a rod rigidly attached to said frame and having a sleeve of rubber material non-rotatably fitted thereon.

* * * * *